US012442524B2

(12) United States Patent
Fleuren et al.

(10) Patent No.: US 12,442,524 B2
(45) Date of Patent: Oct. 14, 2025

(54) LUMINAIRE COMPRISING A RADIO FREQUENCY TRANSCEIVER SPACED FROM A LIGHT ENGINE

(71) Applicant: SIGNIFY HOLDING B.V., Eindhoven (NL)

(72) Inventors: Noud Johannes Fleuren, Baarlo (NL); Nicolaas Antonie Van Rijswijk, Oss (NL); René Cornelis Reuser, Velp (NL); Ronald Johannes Gelten, Geldriop (NL); Ties Van Bommel, Horst (NL)

(73) Assignee: SIGNIFY HOLDING B.V., Eindhoven (NL)

(*) Notice: Subject to any disclaimer, the term of this patent is extended or adjusted under 35 U.S.C. 154(b) by 0 days.

(21) Appl. No.: 18/855,725

(22) PCT Filed: Apr. 5, 2023

(86) PCT No.: PCT/EP2023/058961
§ 371 (c)(1),
(2) Date: Oct. 10, 2024

(87) PCT Pub. No.: WO2023/198552
PCT Pub. Date: Oct. 19, 2023

(65) Prior Publication Data

US 2025/0251120 A1 Aug. 7, 2025

(30) Foreign Application Priority Data

Apr. 15, 2022 (EP) .................................... 22168642

(51) Int. Cl.
*F21V 23/04* (2006.01)
*F21S 8/08* (2006.01)
(Continued)

(52) U.S. Cl.
CPC .......... *F21V 23/0435* (2013.01); *F21S 8/088* (2013.01); *F21V 15/01* (2013.01); *F21V 29/508* (2015.01);
(Continued)

(58) Field of Classification Search
CPC .. F21V 23/0435; F21V 29/508; F21V 29/713; F21V 29/763; F21V 15/01; H05B 47/19; F21S 8/088; H01Q 1/22
See application file for complete search history.

(56) References Cited

U.S. PATENT DOCUMENTS 6,624,845 B2 * 9/2003 Loyd .................. F21V 33/0052 348/E7.087
10,555,393 B1 * 2/2020 Fu ............................ F21S 8/04
(Continued)

FOREIGN PATENT DOCUMENTS

CN 208687548 U 4/2019
GB 2449300 A 11/2008
WO 2014141312 A1 9/2014

*Primary Examiner* — Bryon T Gyllstrom

(57) ABSTRACT

An outdoor luminaire (1000) comprising: a canopy (100) on top of a luminaire frame (200) and having a canopy enclosure (110); an optical chamber (230) bounded by the luminaire frame (200) and a light exit window (210); a light
(Continued)

engine (400) being arranged below the canopy (100) and comprising a LED light source (420) and comprising a first heat sink (410) in (direct) thermal contact with said LED light source (420); an antenna system (500) for transmitting and/or receiving wireless signals is at least partly arranged within the outdoor luminaire (1000); a radio frequency transceiver (300) comprising a second heat sink (395) in (direct) thermal contact with the radio frequency transceiver (300), said radio frequency transceiver (300) is communicatively coupled to the antenna system (500); a support (310) for supporting the radio frequency transceiver (300). In an assembled, closed configuration the radio frequency transceiver (300) is mounted onto the frame (200) by the support (310) with the radio frequency transceiver (300) being at least partly recessed in the canopy enclosure (110) and being arranged at a spacing S from the first heat sink (410).

15 Claims, 8 Drawing Sheets

(51) Int. Cl.

| | |
|---|---|
| ***F21V 15/01*** | (2006.01) |
| ***F21V 29/508*** | (2015.01) |
| ***F21V 29/71*** | (2015.01) |
| ***F21V 29/76*** | (2015.01) |
| ***F21Y 115/10*** | (2016.01) |
| ***H01Q 1/22*** | (2006.01) |
| ***H05B 47/19*** | (2020.01) |

(52) U.S. Cl.

CPC .......... *F21V 29/713* (2015.01); *F21V 29/763* (2015.01); *H01Q 1/22* (2013.01); *H05B 47/19* (2020.01); *F21Y 2115/10* (2016.08)

(56) References Cited

U.S. PATENT DOCUMENTS

| | | | | |
|---|---|---|---|---|
| 11,408,572 | B2 * | 8/2022 | Lim | F21V 21/116 |
| 2005/0036323 | A1 * | 2/2005 | Baken | H01Q 1/1207 362/382 |
| 2007/0285912 | A1 * | 12/2007 | Lin | H01Q 1/06 362/4 |
| 2008/0174456 | A1 * | 7/2008 | Warren | G09F 15/0037 362/183 |
| 2009/0040750 | A1 * | 2/2009 | Myer | H10F 77/68 136/246 |
| 2010/0327766 | A1 * | 12/2010 | Recker | H04L 7/0004 362/20 |
| 2015/0276192 | A1 * | 10/2015 | Kafry | H05B 47/19 362/362 |
| 2015/0377479 | A1 * | 12/2015 | Pescod | H01Q 1/22 362/85 |
| 2018/0045388 | A1 * | 2/2018 | McDowell | F21V 29/15 |

* cited by examiner

LUMINAIRE COMPRISING A RADIO FREQUENCY TRANSCEIVER SPACED FROM A LIGHT ENGINE

CROSS-REFERENCE TO PRIOR APPLICATIONS

This application is the U.S. National Phase application under 35 U.S.C. § 371 of International Application No. PCT/EP2023/058961, filed on Apr. 5, 2023, which claims the benefit of European Patent Application No. 22168642.1, filed on Apr. 15, 2022. These applications are hereby incorporated by reference herein.

BACKGROUND OF THE INVENTION

The invention relates to an outdoor luminaire comprising a light engine and a radio frequency transceiver, wherein the radio frequency transceiver is held by a support structure in a position spaced from the light engine.

A recent development is transforming existing outdoor luminaires into a connectivity grid. Known solutions provide a network densification in and around cities by transforming existing outdoor luminaires into a connectivity grid. Thereto these outdoor luminaires are mounted to poles and used e.g. for street and roadway lighting. Though the design has been in use for decades, it has been recently updated with an antenna and radio frequency transceiver for connectivity. It is desired to improve the performance of these luminaires in terms of communication capabilities, such as via internet connectivity, as well as an improvement in thermal management and/or maintenance.

WO2014141312A1 discloses a street type led lighting body integrated with telecommunication devices.

US20180045388A1 discloses a streetlight retrofit to provide access for wireless and cellular networks.

CN208687548U discloses a kind of street lamp type antenna.

SUMMARY OF THE INVENTION

It is an object of the invention to provide an outdoor luminaire suitable for communication in which at least one of the disadvantages of the known outdoor luminaires suitable for communication, is counteracted. Thereto an outdoor luminaire according to the appended claims is provided.

In a first aspect of the invention the outdoor luminaire comprises:

- a canopy on top of a luminaire frame and having a canopy enclosure;
- an optical chamber bounded by the luminaire frame and a light exit window, said optical chamber at least partly accommodating a light engine;
- the light engine being arranged below the canopy and comprising a LED light source configured to generate LED light and comprising a first heat sink in (direct) thermal contact with said LED light source (and optionally a driver which can be accommodated anywhere inside the luminaire, for example in the optical chamber and/or canopy enclosure), (in operation) said LED light being emitted from the light exit window as luminaire light;
- a luminaire axis extending through a center of the canopy and a midpoint of the optical chamber, (typically in an installed arrangement of the outdoor luminaire the direction from said center to said midpoint is along the direction of gravity, along in this respect means it can deviate by 10 degrees from the exact vertical direction of gravity);
- an antenna system comprising one or more antennas for transmitting and/or receiving wireless signals is at least partly arranged within the outdoor luminaire, (i.e. at least partly in the canopy enclosure and/or optical chamber and may partly protrude from the luminaire);
- a radio frequency transceiver comprising radio frequency transceiver electronics and a second heat sink in (direct) thermal contact with the radio frequency transceiver, said radio frequency transceiver is communicatively coupled to the antenna system and configured to control the transmission of transmitted wireless signals by the antenna system and/or process receiving wireless signals received at the antenna system;
- a support for supporting the radio frequency transceiver,
- wherein the support is mounted onto the luminaire frame, the radio frequency transceiver is mounted onto the support and wherein the radio frequency transceiver being at least partly recessed (and preferably fully recessed) in the canopy enclosure and being arranged at a spacing S from the first heat sink.

Typically the outdoor luminaire is a streetlight luminaire. A dominant architecture of the outdoor luminaire is a pole with a 'lantern' based design in which a LED light engine is arranged in a top of said lantern above a, typically a four-sided inverse cone/pyramid shaped exit window, and providing light in a downward direction to illuminate the road and/or pavement around said pole. Other convenient shapes of the exit window are round, elliptical and hexagonal. Said light engine comprises a LED light source, typically a LED array, with optics, typically a lens array, to redirect at least part of the LED light emitted by said LED light source. A heatsink, typically with fins at its back, is cooling said LED light source. Because the radio frequency transceiver, also referred to in the description as radio unit, also provides a significant amount of heat it also comprises a heatsink. The expression "radio frequency transceiver" can equally be substituted by the expressions "wireless module", or "radio module" or "combination of transmitter and receiver". Said radio unit is covered by a canopy/cover, typically shaped as an inverse cone or pyramid. Preferably the center of the radio frequency transceiver is mounted in a range of 0.3*H-0.7*H in the canopy recess, preferably in the center of the recess, wherein H is the height of the canopy recess in the direction of gravity. In embodiments, H may be at least 20 cm.

In order to improve thermal management, the radio unit is lifted and spaced by an open, air spacing having a spacing height S from (heat fins of) said light engine, preferably S is at least 1 cm to have enough space for a good air flow and cooling, preferably is at least 2 cm more preferably is at least 3 cm. Yet, said spacing preferably is at the most 10 cm, more preferably is at the most 8 cm, most preferably is at the most 6 cm, to render the luminaire not become too spacious. For this spacing, typically a legged radio unit support can be used. Said support comprises a support base and support legs typically are arranged at an angle $\alpha$ to said support base and the radio unit at its lifted position, typically, if $\alpha$ is different from 90°, said angle $\alpha$ is in a range of $10° \leq \alpha \leq 80°$, yet $\alpha$ could also be 90°. Said support is mounted to said (inner surface) of said lantern and typically comprises four legs with the support base above the light engine. In this way, an open structure is obtained such that the cooling of the LED engine is warranted. In other words, openings between said legs are created for enhancing air flow in said luminaire in order to further improve the thermal heat dissipation characteristics of the outdoor luminaire. Alternatively, the number of support legs could be, for example, two, three or six and could be related to, for example be the same as, the number of antennas.

For a further improved mechanical integrity said support may comprise an inner skeleton, for example a ring shaped part (e.g. folded or welded metal part or parts), which is connected to the luminaire frame. The openings between the legs are typically in a range from 20% to 80% of the total area of the virtual wall of the inner frame made up by the legs for and enhanced cooling via convective air flow and yet to provide mechanical stability. Through holes may be created in said legs to increase the open area and enhance the amount of free convective air flow. If the openings make up less than 20% of the total area of the virtual wall of the inner frame the free convective air flow may become too low for the desired amount of cooling. Yet if the openings make up more than 80% of the total area of the virtual wall of the inner frame, the mechanical integrity of said support unit may become lower than as desired.

Said legs may comprise perforations between the legs and support base to facilitate bending between the legs and the support base, which is especially desired when said support unit is a monolithic part e.g. metal plate from which both the support base and support legs are integrally formed. Said support unit is preferably in thermal contact with said canopy which is typical a shaped metal plate e.g. of aluminum to contribute to the cooling of said LED light source and radio unit. One or more antennas, for example four (or more) antennas may be mounted to said support, for example, to said inner skeleton. All antennas having a respective line of sight substantially in a horizontal plane, i.e. may deviate to 10 degrees or less from the exact horizontal plane. The directions of the lines of sight of the antennas are preferably evenly in said (substantially) horizontal plane to enable a 360 degrees connectivity in said horizontal plane and thereto are arranged in a specific manner of the horizontal periphery of the frame. Preferably the antennas together cover at least 300 degrees, such as 360 degrees, yet it is also possible that the antennas together cover at least 180 degrees, for example two antennas each covering 120-140 degrees or three antennas together covering 270 degrees.

Said radio unit is at least partly but preferably fully recessed in a recess of said canopy. Said canopy is preferably hingedly connected to said top to provide easy maintenance to said radio unit and/or light engine. It uses the full potential of the canopy space. Furthermore, the canopy may be made of metal and in (direct) thermal contact with the first heat sink and/or the second heat sink, preferably via said support.

Hence, as already elucidated above the outdoor luminaire may have several different features and/or combinations of features, which are specifically mentioned below.

The outdoor luminaire may have the feature that 1 cm<=spacing S.

The outdoor luminaire may have the feature that the support comprises a support base and a plurality of support legs that connect the support base with the luminaire frame, wherein the radio frequency transceiver is arranged on the support base to elevate said radio frequency transceiver from the first heat sink at said spacing S.

The outdoor luminaire may have the feature that openings are formed in between the plurality of support legs and the luminaire frame for enabling circulation of an air flow along the radio frequency transceiver and the first heat sink.

The outdoor luminaire may have the feature that the legs are provided with through holes for further enabling circulation of an air flow along the radio frequency transceiver and the first heat sink.

The outdoor luminaire may have the feature that the number of legs is at least three, preferably four.

The outdoor luminaire may have the feature that the legs are at an angle α with the support base, wherein 10°<=α<=80°, preferably 30°<=α<=60°.

The outdoor luminaire may have the feature that the support legs are fixed onto an inner skeleton, wherein the inner skeleton is fixed to the luminaire frame, i.e. to an inner surface of the luminaire frame.

The outdoor luminaire may have the feature that the skeleton is ring shaped.

The outdoor luminaire may have the feature that the inner skeleton further supports the one or more antennas.

The outdoor luminaire may have the feature that the antennas are mounted on the support base.

The outdoor luminaire may have the feature that at the interface between the support base and the support legs perforations are provided for facilitating shaping of the support The outdoor luminaire may have the feature that the openings between the legs and/or through holes make up an area which is in between 20-80% of an area of a virtual wall formed by the legs.

The outdoor luminaire may have the feature that the canopy is made of metal and in thermal contact with the first heat sink and/or the second heat sink, preferably via said support.

The outdoor luminaire may have the feature that the canopy is hingedly connected to said frame enabling opening the luminaire for easy access to the radio frequency transceiver. This replacing of the light source/engine and/or servicing/maintenance of the outdoor luminaire is facilitated.

The outdoor luminaire may have the feature that the LED light source may comprise a plurality of LEDs. Especially, the LEDs may be configured in an array comprising N LEDs in rows and M LEDs in columns. Preferably, N may be at least two and M may be at least two. The light source could be a Chip on Board (COB) with peanut optics or reflector.

The outdoor luminaire may have the feature that the LED light may be white light. Especially, the white light may have a correlated color temperature in a range from 2000 to 6000 K and/or a color rendering index of at least 70 but preferably at least 80.

The outdoor luminaire may have the feature that the light exit window comprise a window panel that may be translucent, especially transparent. In a preferred configuration, the light exit window may comprise a plurality of light exits (plates) such as for example four light exits (plates), yet the window pane could also be a single circumferential panel. Also the light exit window could be without a window panel.

The outdoor luminaire may have the feature that the optical chamber may be a light mixing chamber configured to mix LED light.

The outdoor luminaire may have the feature that the first heatsink and/or second heatsink comprises a plurality of fins.

The outdoor luminaire may have the feature that the support legs may have a support leg length L1, wherein L1 may be at least 2 cm, preferably at least 3 cm, more preferably at least 4 cm, most preferably at least 5 cm.

The outdoor luminaire may have the feature that the support base may have a support base area Asb, wherein Asb may be at least 25 cm^2, preferably at least 40 cm^2, more preferably at least 50 cm^2, most preferably at least 60 cm^2.

The outdoor luminaire may have the feature that the support legs may be provided with through holes e.g. each support leg may comprise one or more through holes. Especially, the through holes may have a diameter/width of at least 1 cm.

The outdoor luminaire may have the feature that at an interface between the support base and (each of) the support legs one or more (e.g. at least five) perforations may be provided which may have a diameter/width of less than 4 mm.

BRIEF DESCRIPTION OF THE DRAWINGS

The invention will now be further explained by means of the schematic drawings, which may not be up to scale and in which some parts may be enlarged for the sake of explanation. The drawings are by no means meant to limit the scope of the invention, but rather are for exemplifying the ample possibilities of the invention. In the drawings.

DESCRIPTION OF PREFERRED EMBODIMENTS

Figure 1A:
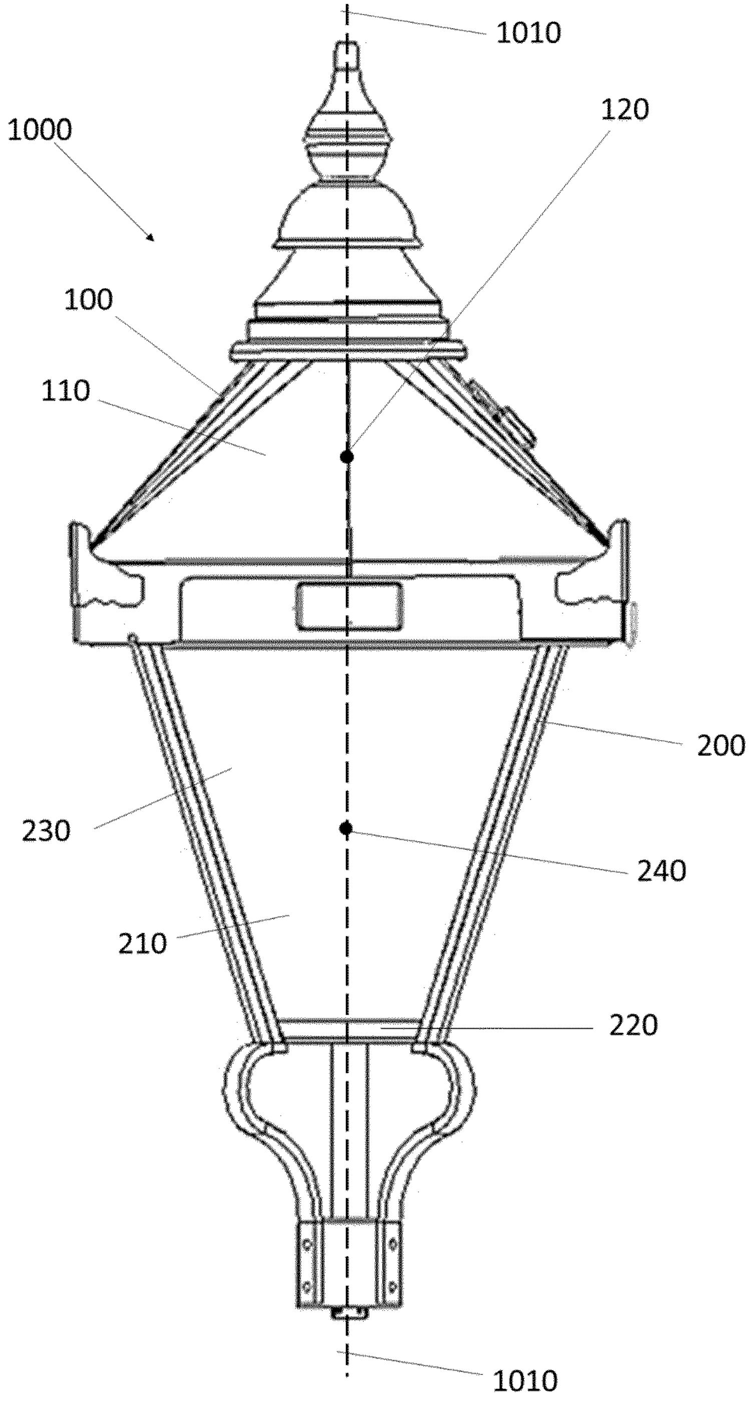
FIG. 1A shows a side view of a first embodiment of an outdoor luminaire according to the invention in a closed configuration.

FIG. 1A shows a side view of basic structure of a first embodiment of an outdoor luminaire 1000 according to the invention in a closed configuration. The outdoor luminaire 1000 comprises a canopy 100 on top of a luminaire frame 200 and having a canopy enclosure 110. The luminaire frame 200 together with a light exit window 210 and a bottom wall 220 encloses an optical chamber 230. A luminaire axis 1010 extends through a center 120 of the canopy 100 and a midpoint 240 of the optical chamber 230. When the luminaire is in a mounted configuration, i.e. is installed, the luminaire axis 1010 extends in the vertical direction of gravity, with the direction from the center 120 of the canopy 100 to the midpoint 240 of the optical chamber 230 being the downwards direction.

Figure 1B:
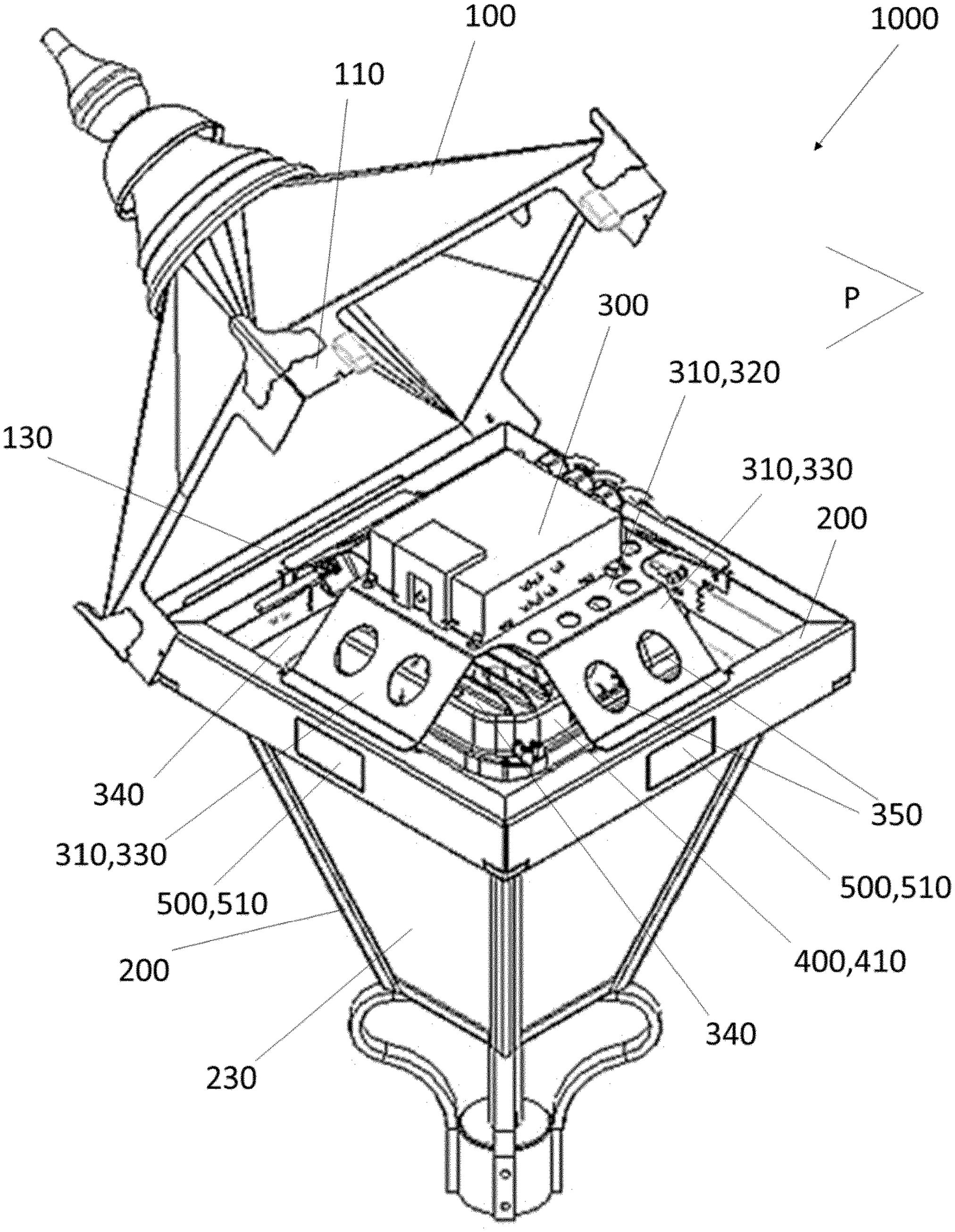
FIG. 1B shows a perspective view of the outdoor luminaire of FIG. 1A in an opened configuration.

FIG. 1B shows a perspective view of the basic structure of the outdoor luminaire 1000 of FIG. 1A in an opened configuration. The canopy 100 is hingedly connected to the luminaire frame 200 via a hinge 130. A radio frequency transceiver 300 is mounted on a support base 320 of a support 310 and is arranged in the canopy enclosure 110. The support base 320 is connected to the luminaire frame 200 via four support legs 330, such that the radio frequency transceiver 300 is spacingly arranged at a spacing S (not shown) from a first heat sink 410 of a light engine 400, said light engine 400 being arranged below the canopy 100 in the optical chamber 230. Openings 340 are present in between the four support legs 330 and the luminaire frame 200, as well as through holes 350 are provided in the support legs 330 enabling free (convective) air flow through said spacing S in between the radio frequency transceiver 300 and the first heat sink 410 of the light engine 400. Four antennas 510 of an antenna system 500, of which only two are visible in the figure, are mounted to the luminaire frame 200 in a partly recessed manner, the antennas 510 face in four mutually different directions in a horizontal plane P, similar to the four cardinal directions of a compass, i.e. similar to facing in a North, East, South, West directions. Or expressed in other words, two pairs of antennas 510 are arranged in the horizontal plane P at a mutual angle of 90 degrees, while of each pair of antennas 510 the antennas 510 face in opposite directions (i.e. are at a mutual angle of 180 degrees). Said radio frequency transceiver 300 is communicatively coupled to the antenna system 500 and configured to control the transmission of transmitted wireless signals by the antenna system 500 and/or process receiving wireless signals received at the antenna system 500.

Figure 1C:
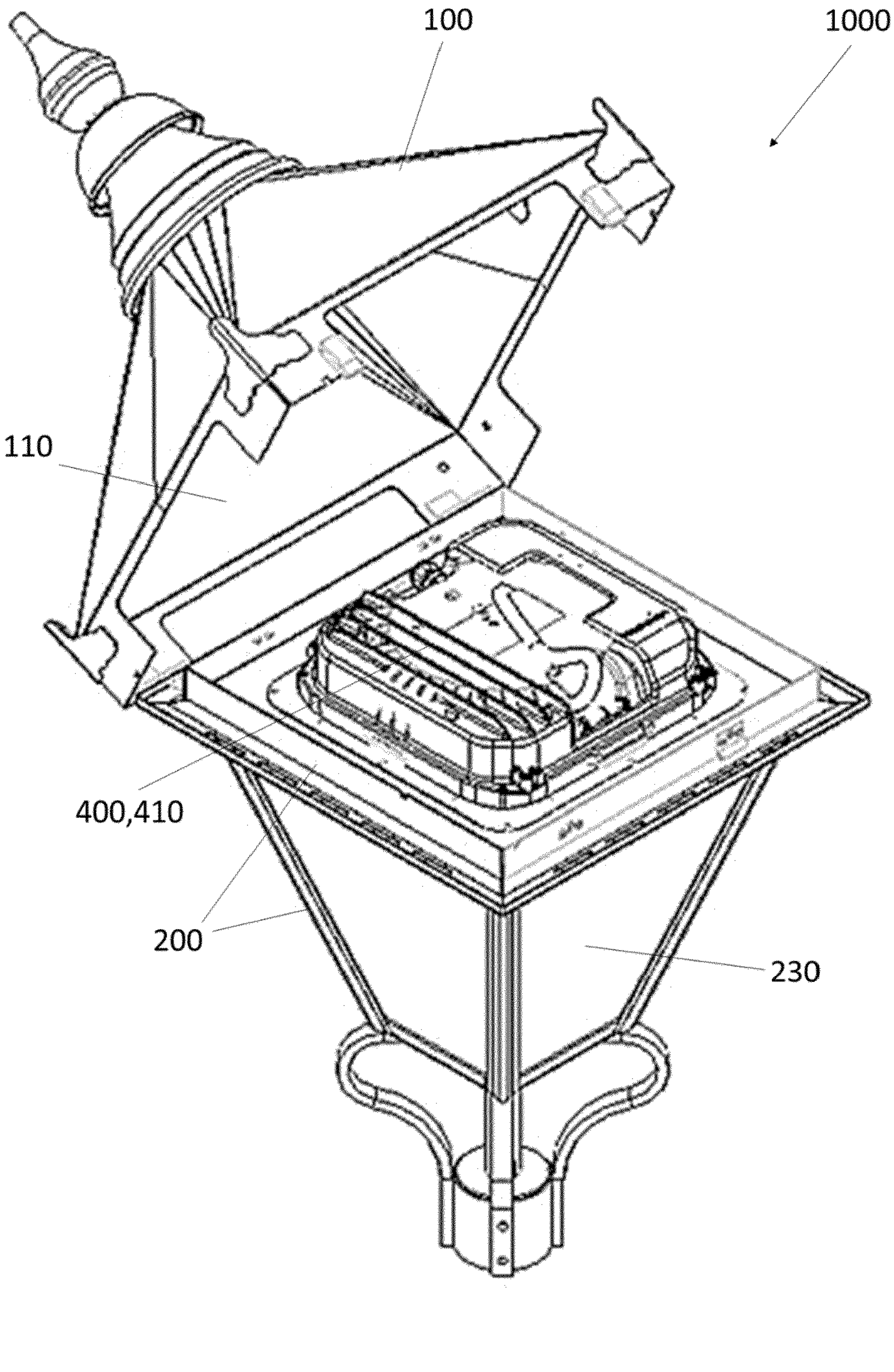
FIG. 1C shows a perspective view of the outdoor luminaire of FIG. 1A in a partly disassembled configuration.

FIG. 1C shows a perspective view of the outdoor luminaire 1000 of FIG. 1A in a partly disassembled configuration, i.e. wherein the radio frequency transceiver is removed, and the first heat sink 410 of the light engine 400 now being clearly exposed/visible. The first heat sink 410 may partly extend from the optical chamber 230 into the canopy 110 enclosure of the canopy 100. Said first heat sink 410 is in mounted to the metal luminaire frame 200 of the outdoor luminaire 1000, such that heat as generated by the light source (not shown) of the light engine 400 can be dissipated from the first heat sink 410 to the luminaire frame 200 via thermal conduction, and subsequently from the luminaire frame 200 being dissipated into the environment.

Figure 1D:
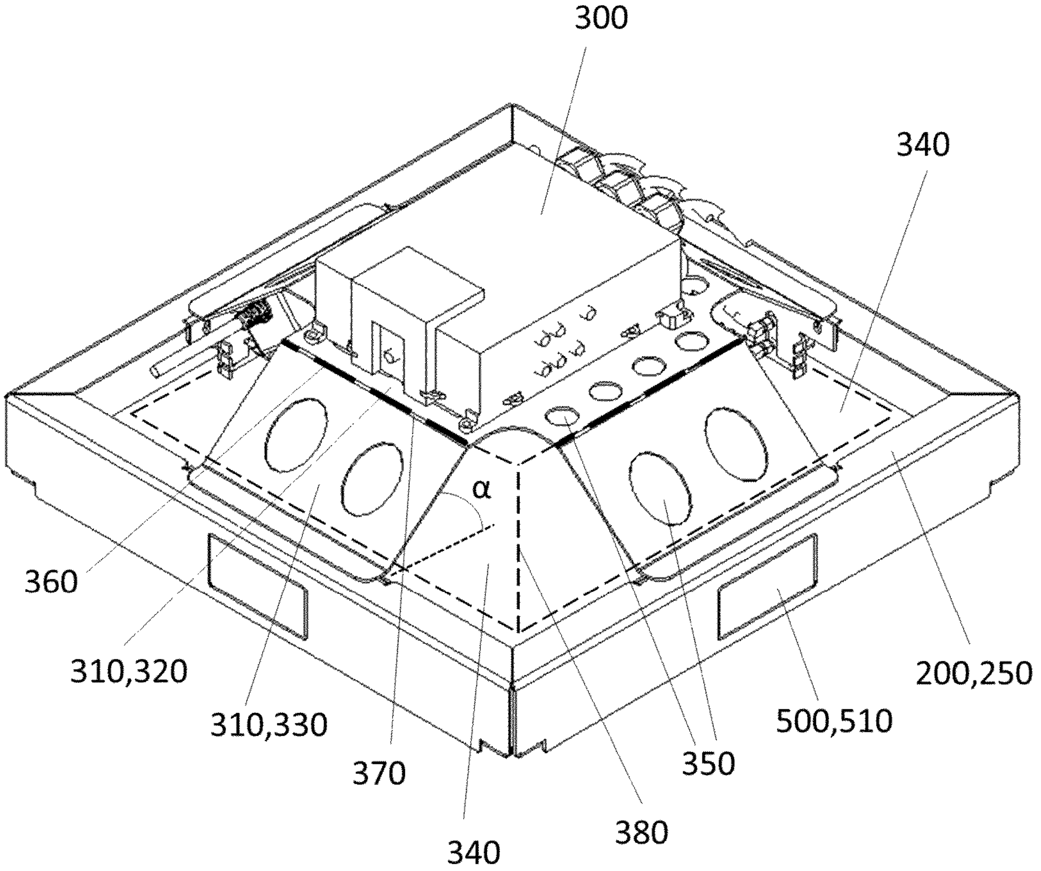
FIG. 1D shows a support with mounted radio frequency transceiver and antennas of the outdoor luminaire of FIG. 1A.

FIG. 1D shows a support 310 with mounted radio frequency transceiver 300 and antennas 510 of the antenna system 500 as isolated from the outdoor luminaire of FIG. 1A. As shown the radio frequency transceiver 300 is mounted on the support base 320, which on its turn is fixed via the four support legs 330 to the luminaire frame 200 via an inner, ring shaped skeleton 250. The support base 320 and the support legs 330 are a monolithic piece, i.e. are integrally made from a single metal plate. The interface 360 between the support base 320 and the support legs 330 are provided with perforations 370 for facilitating shaping of the support 310. Here, the support legs 330 are arranged at an angle α of about 45 degrees with the (plane of the) support base 320. Said inner skeleton 250 is made of good thermal conductive metal, such as aluminum, copper or zinc coated iron. The four antennas 510 are mounted on and supported by the inner skeleton 250. Openings 340 are present in between the support legs 330 and the inner skeleton 250, as well as through holes 350 both in the support legs 330 and in the support base 320. The openings 340 between the support legs 330 make up about 50% of an area of a virtual wall 380 (indicated by dotted lines) formed by the support legs 330.

Figure 2A:
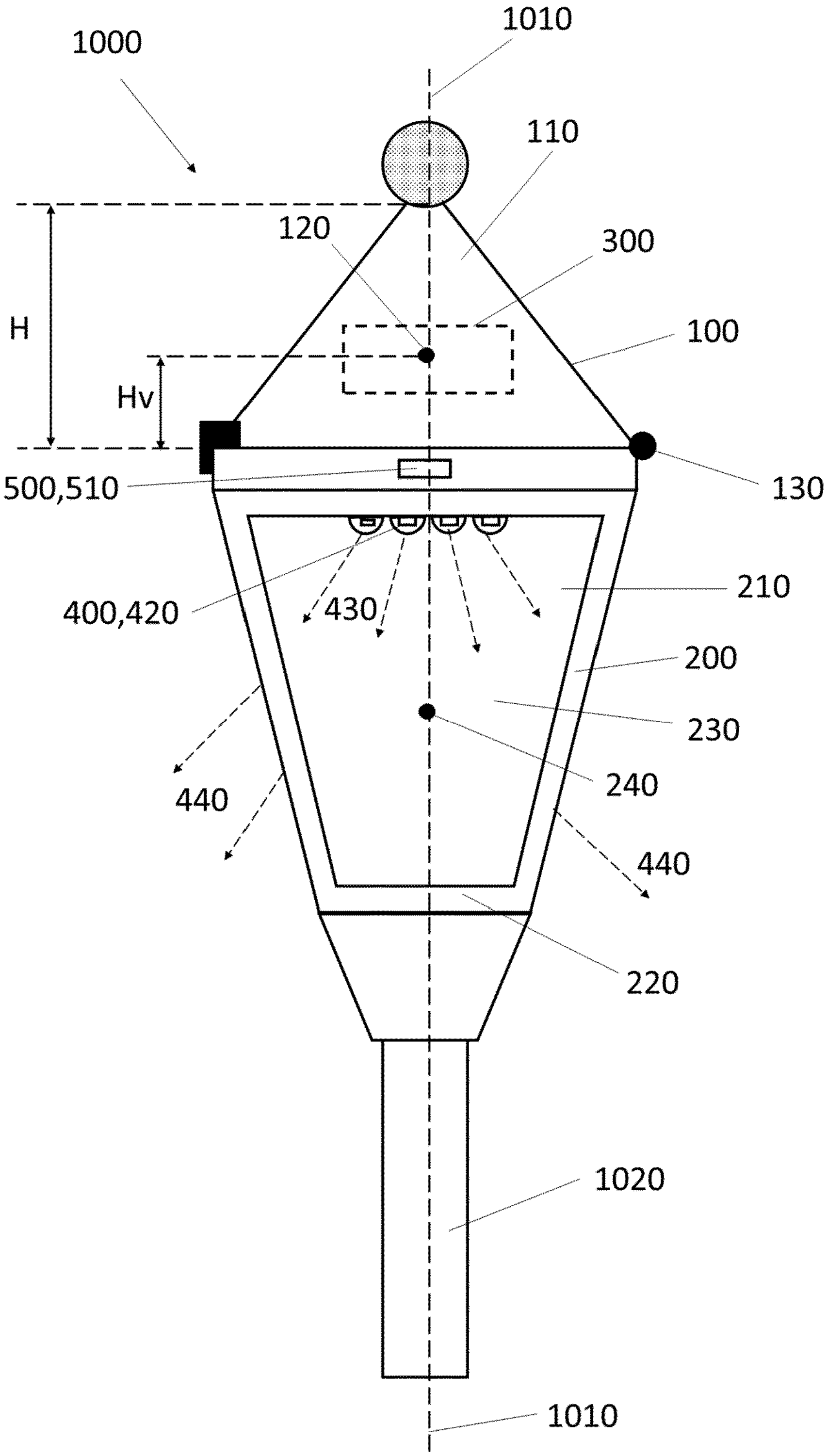
FIG. 2A shows a side view of a second embodiment of the outdoor luminaire according to the invention.

FIG. 2A shows a side view of a second embodiment of the outdoor luminaire 1000 according to the invention. The outdoor luminaire 1000 is a streetlight and comprises a pole 1020 on which is mounted a canopy 100 on top of a luminaire frame 200, said canopy 100 having a canopy enclosure 110. The luminaire frame 200 together with a light exit window 210 and a bottom wall 220 encloses an optical chamber 230. A luminaire axis 1010 extends through a center 120 of the canopy 100 and a midpoint 240 of the optical chamber 230. When the luminaire is in a mounted configuration, i.e. is installed, the luminaire axis 1010 extends in the vertical direction of gravity, with the direction from the center 120 of the canopy 100 to the midpoint 240 of the optical chamber 230 being the downwards direction. Antennas 510 (only one is shown) of antenna system 500 are supported by the luminaire frame 200. A light engine 400 being arranged below the canopy 100 and comprising a LED light source 420 configured to generate LED light 430 and comprising a first heat sink (not shown) in (direct) thermal contact with said LED light source 420, said LED light 430 being emitted from the light exit window 210 as luminaire light 440. Said optical chamber 230 at least partly accommodating the light engine 400, i.e. here at least the light source 420. The canopy 100 is hingedly connected to the luminaire frame 200 by a hinge 130. The canopy enclosure 110 has a height H and accommodates a radio frequency transceiver 300 (indicated in ghost lines), said radio frequency transceiver being arranged at a vertical position Hv of about 0.45*H, at/close to the center 120 of the canopy.

Figure 2B:
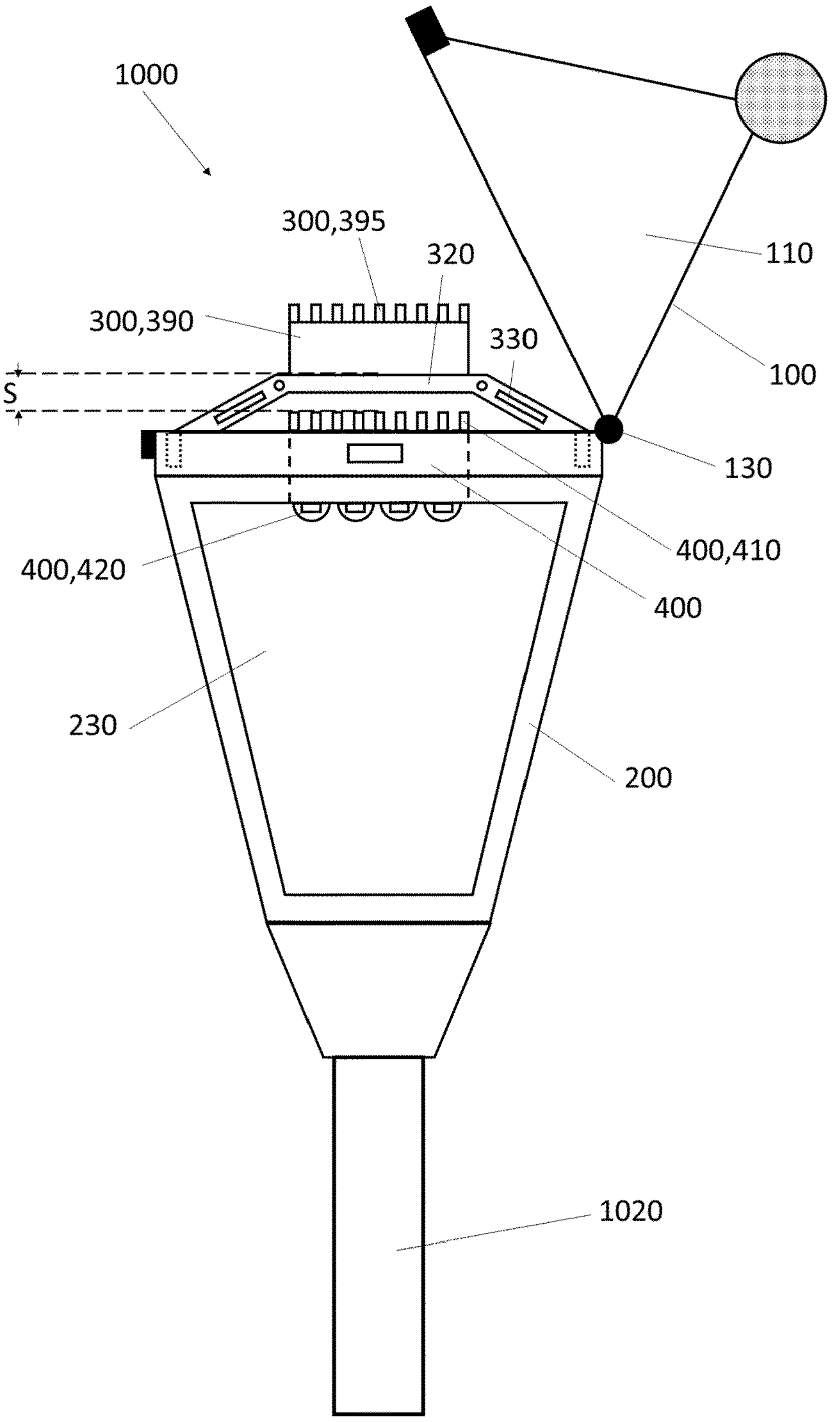
FIG. 2B shows a side view of the outdoor luminaire of FIG. 2A in an opened configuration.

FIG. 2B shows a side view of the outdoor luminaire of FIG. 2A in an opened configuration mounted on the pole 1020. The canopy 100 is hingedly connected to the luminaire frame 200 via the hinge 130. The radio frequency transceiver 300 is mounted on the support base 320 of the support 310 and is arranged in the canopy enclosure 110. The support base 320 is connected to the luminaire frame 200 via two support legs 330, such that the radio frequency transceiver 300 is spacingly arranged at a spacing S, S being about 4 cm in the figure, from the first heat sink 410 of the light engine 400. Said light engine 400 being arranged below the canopy 100 with its light source 420 in the optical chamber 230 and with its first heat sink 410 in the canopy enclosure 110 (when the streetlight luminaire is closed). The radio frequency transceiver 300 comprises radio frequency transceiver electronics 390 and a second heat sink 395, which is in (direct) thermal contact with the radio frequency transceiver electronics 390.

Figure 3A:
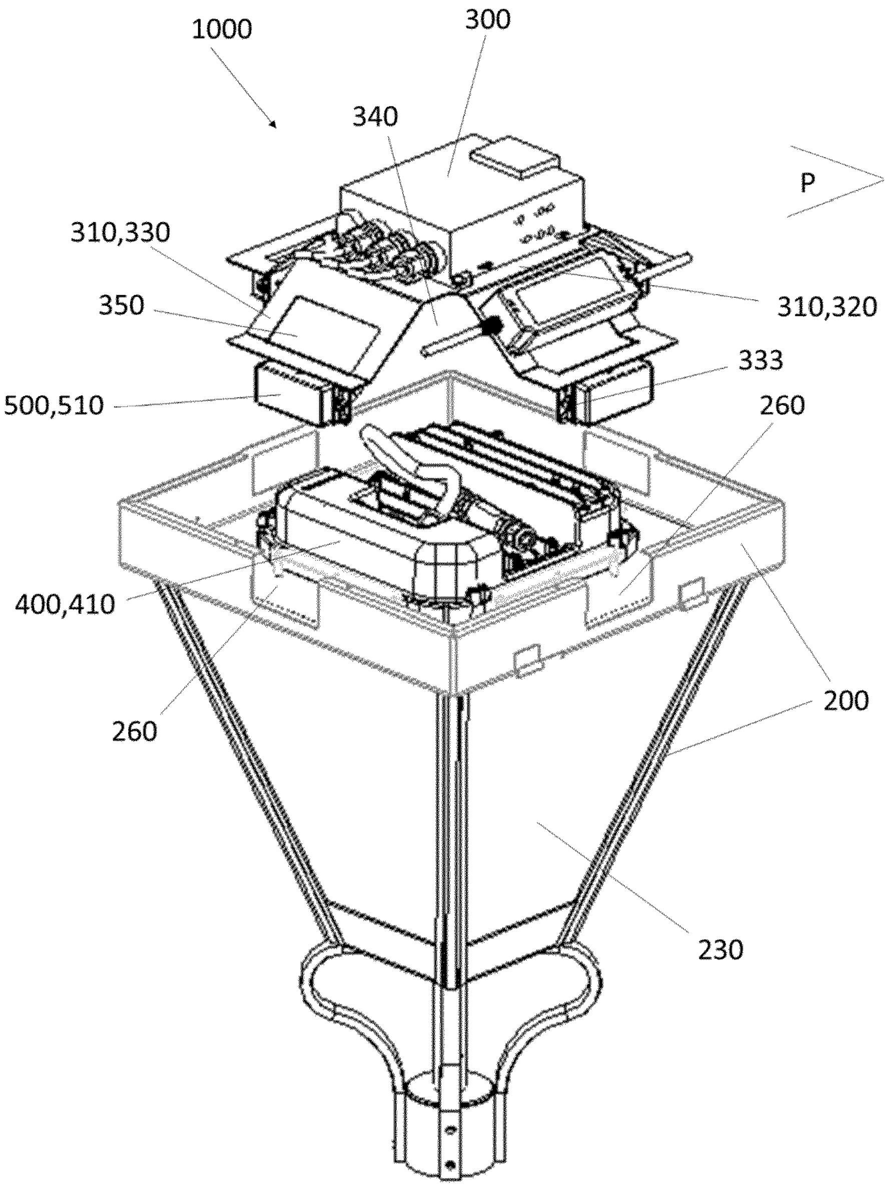
FIG. 3A shows a perspective side view of a third embodiment of the outdoor luminaire according to the invention.

FIG. 3A shows a perspective side view of a third embodiment of the outdoor luminaire 1000 according to the invention with the canopy being removed. A radio frequency transceiver 300 is mounted on a support base 320 of a support 310 and is to be arranged in the canopy enclosure. The support base 320 is connected to the luminaire frame 200 via four support legs 330, such that the radio frequency transceiver 300 is spacingly arranged at a spacing S (not shown) from a first heat sink 410 of a light engine 400, said light engine 400 being arranged in the optical chamber 230. Openings 340 are present in between the four support legs 330 and the luminaire frame 200, as well as through holes 350 are provided in the support legs 330 enabling free (convective) air flow through said spacing S in between the radio frequency transceiver 300 and the first heat sink 410 of the light engine 400. Antennas 510 (four) of an antenna system 500 are mounted to carriers 333 of the support 310 (for details see FIG. 3B) and are to be accommodated in slots 260 of the luminaire frame 200 in an at least partly recessed manner over the light engine 400 onto the luminaire frame 200 when the radio frequency transceiver 300 with support 310 and antennas 510 are installed. The antennas 510 face in four mutually different directions in a horizontal plane P, similar to the four cardinal directions of a compass, i.e. similar to facing in a North, East, South, West directions. Or expressed in other words, two pairs of antennas 510 are arranged in the horizontal plane P at a mutual angle of 90 degrees, while of each pair of antennas 510 the antennas 510 face in opposite directions (i.e. are at a mutual angle of 180 degrees). Said radio frequency transceiver 300 is communicatively coupled to the antenna system 500 and configured to control the transmission of transmitted wireless signals by the antenna system 500 and/or process receiving wireless signals received at the antenna system 500.

Figure 3B:
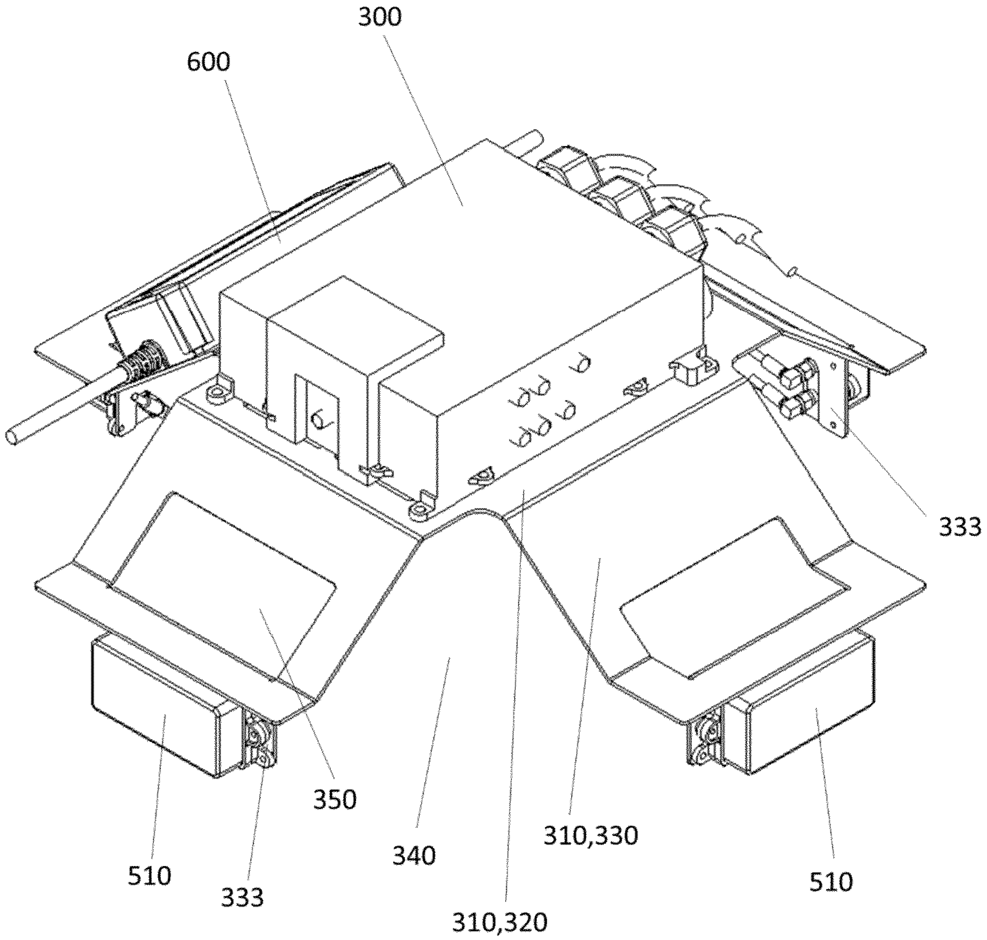
FIG. 3B shows a support with mounted radio frequency transceiver and antennas of the outdoor luminaire of FIG. 3A.

FIG. 3B shows a support 310 with mounted radio frequency transceiver 300 and antennas 510 as isolated from the outdoor luminaire of FIG. 3A. As shown the radio frequency transceiver 300 is mounted on the support base 320, which on its turn is to be fixed via the four support legs 330 to the luminaire frame via an inner, ring shaped skeleton (see FIG. 3A). The support base 320 and the support legs 330 are a monolithic piece, i.e. are integrally made from a single metal plate. The four antennas 510 are mounted on and supported by the support 310. Openings 340 are present in between the support legs 330, as well as through holes 350 in the support legs 330. To create the through holes 350, incisions are made in the support legs 330 enabling a part of the support leg to be folded to form a folded, cut-out part functioning as a carrier 333 for a respective antenna 510 associated with its respective support leg 330. Alternatively or additionally, at least one driver 600 could be arranged and carried by at least one of the support legs 330.

The invention claimed is:

1. An outdoor luminaire comprising:

a canopy on top of a luminaire frame and having a canopy enclosure;

an optical chamber bounded by the luminaire frame and a light exit window, said optical chamber at least partly accommodating a light engine;

the light engine being arranged below the canopy and comprising a LED light source configured to generate LED light and comprising a first heat sink in thermal contact with said LED light source, said LED light being emitted from the light exit window as luminaire light;

a luminaire axis extending through a center of the canopy and a midpoint of the optical chamber;

an antenna system comprising one or more antennas for transmitting and/or receiving wireless signals is at least partly arranged within the outdoor luminaire;

a radio frequency transceiver comprising radio frequency transceiver electronics and a second heat sink in thermal contact with the radio frequency transceiver electronics, said radio frequency transceiver is communicatively coupled to the antenna system and configured to control the transmission of transmitted wireless signals by the antenna system and/or process receiving wireless signals received at the antenna system;

a support for supporting the radio frequency transceiver, wherein the support is mounted onto the luminaire frame, the radio frequency transceiver is mounted onto the support and wherein the radio frequency transceiver being at least partly recessed in the canopy enclosure and being arranged at a spacing S from the first heat sink.

2. The outdoor luminaire as claimed in claim 1, wherein 1 cm≤spacing S.

3. The outdoor luminaire as claimed in claim 1, wherein the support comprises a support base and a plurality of support legs that connect the support base with the luminaire frame, wherein the radio frequency transceiver is arranged on the support base.

4. The outdoor luminaire as claimed in claim 3, wherein openings are formed in between the plurality of support legs and the luminaire frame.

5. The outdoor luminaire as claimed in claim 4, wherein the openings between the support legs and the luminaire frame make up an area which is in between 20-80% of an area of a virtual wall formed by the support legs.

6. The outdoor luminaire as claimed in claim 3, wherein the support legs are provided with through holes.

7. The outdoor luminaire as claimed in claim 3, wherein the number of support legs is at least three, preferably four.

8. The outdoor luminaire as claimed in claim 3, wherein the support legs are arranged/shaped at an angle α with the support base, wherein 10°<=α<=80°, preferably 30°<=α<=60°.

9. The outdoor luminaire as claimed in claim 3, wherein the support legs are fixed onto an inner skeleton, wherein the inner skeleton is fixed to the luminaire frame.

10. The outdoor luminaire as claimed in claim 9, wherein the inner skeleton is ring shaped.

11. The outdoor luminaire as claimed in claim 9, wherein the inner skeleton further supports the one or more antennas, preferably four antennas arranged in different directions.

12. The outdoor luminaire as claimed in claim 3, wherein at an interface between the support base and the support legs one or more perforations are provided.

13. The outdoor luminaire as claimed in claim 1, wherein the antennas are mounted on the support.

14. The outdoor luminaire as claimed in claim 1, wherein the canopy is made of metal and in thermal contact with the first heat sink and/or the second heat sink, preferably via said support.

15. The outdoor luminaire as claimed in claim 1, wherein the canopy is hingedly connected to said luminaire frame enabling opening the luminaire for easy access to the radio frequency transceiver.

* * * * *